United States Patent
Gedliczka et al.

(10) Patent No.: US 11,893,032 B2
(45) Date of Patent: Feb. 6, 2024

(54) MEASURING RELEVANCE OF DATASETS TO A DATA SCIENCE MODEL

(71) Applicant: International Business Machines Corporation, Armonk, NY (US)

(72) Inventors: Tymoteusz Gedliczka, Cracow (PL); Szymon Brandys, Cracow (PL); Piotr Grzywna, Cracow (PL); Tomasz Kania, Cracow (PL); Maciej Madej, Cracow (PL); Krzysztof Pitula, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 17/572,668

(22) Filed: Jan. 11, 2022

(65) Prior Publication Data

US 2023/0222129 A1    Jul. 13, 2023

(51) Int. Cl.
*G06F 16/2457* (2019.01)

(52) U.S. Cl.
CPC .............. *G06F 16/24578* (2019.01)

(58) Field of Classification Search
CPC ................................................ G06F 16/24578
USPC ............................................................ 707/728
See application file for complete search history.

(56) References Cited

U.S. PATENT DOCUMENTS

| 10,210,551 | B1 | 2/2019 | Todd | |
|---|---|---|---|---|
| 2011/0047163 | A1* | 2/2011 | Chechik | G06F 16/70 |
| | | | | 707/E17.071 |
| 2018/0165604 | A1* | 6/2018 | Minkin | G06Q 10/06 |
| 2020/0134363 | A1* | 4/2020 | Hubenig | G06F 18/2115 |
| 2020/0250562 | A1 | 8/2020 | Bly | |
| 2020/0327134 | A1* | 10/2020 | Freed | G06F 16/288 |
| 2021/0406685 | A1* | 12/2021 | Carmody | G06N 3/04 |
| 2022/0300493 | A1* | 9/2022 | Meagher, III | G06F 16/2455 |

(Continued)

OTHER PUBLICATIONS

"Find similarity between documents using TF IDF", accessed on Nov. 17, 2021, 10 pages, <https://iq.opengenus.org/document-similarity-tf-idf/>.

(Continued)

*Primary Examiner* — Hosain T Alam
*Assistant Examiner* — Saba Ahmed
(74) *Attorney, Agent, or Firm* — Edward P. Li

(57) ABSTRACT

A computer-implemented method, a computer program product, and a computer system for measuring relevance of datasets to data science models. One or more servers implement steps: extract keywords in each data science model; determine first relative frequencies of the respective keywords in each data science model, for each source group in the data science models; extract keywords in each dataset; determine second relative frequencies of the respective keywords in each dataset, for each source group in the datasets; determine weights of the keywords; calculate first aggregated relevant scores of the respective keywords in each data science model, based on the first relative frequencies and the weights; calculate second aggregated relevant scores of the respective keywords in each dataset, based on the second relative frequencies and the weights. One or more servers calculate similarity between vectors of the first and second aggregated relevant scores, based on a similarity measure between vectors.

18 Claims, 5 Drawing Sheets

(56) References Cited

U.S. PATENT DOCUMENTS

2022/0318224 A1* 10/2022 Thompson .......... G06F 16/2282

OTHER PUBLICATIONS

"Nutritionparser • PyPI", access on Nov. 19, 2021, © 2021 Python Software Foundation, 3 pages, <https://pypi.org/project/nutritionparser/>.

"Overview of Watson Studio Local—IBM Documentation", access on Nov. 19, 2021, 4 pages, <https://content-dsxlocal.mybluemix.net/docs/content/SSAS34_current/DODS/DODS_Introduction/modelbuilder.html#ModelBuilderInterface_section_PrepareInputData>.

Mell et al., "The NIST Definition of Cloud Computing", National Institute of Standards and Technology U.S. Department of Commerce, Special Publication 800-145, Sep. 2011, 7 pages.

Scott, William, "TF-IDF from scratch in python on a real-world dataset.", Feb. 15, 2019, 21 pages, <https://towardsdatascience.com/tf-idf-for-document-ranking-from-scratch-in-python-on-realworld->.

Wikipedia "tf-idf", page last edited on Sep. 18, 2021, 7 pages, <https://en.wikipedia.org/wiki/Tf%E2%80%93idf>.

Wikipedia, "Word2vec", page lasted edited on Nov. 17, 2021, 5 pages, <https://en.wikipedia.org/wiki/Word2vec>.

* cited by examiner

MEASURING RELEVANCE OF DATASETS TO A DATA SCIENCE MODEL

BACKGROUND

The present invention relates generally to data science platforms, and more particularly to measuring relevance of datasets to a data science model.

In data science platforms such as IBM Watson Studio, users work with data in form of static datasets (e.g., a comma-separated values (CSV) file and an Excel spreadsheet) or database tables. The data is consumed by various data science models, such as artificial Intelligence (AI) models, machine learning models, and optimization models, to provide insight.

When developing a model using a user interface, the user typically at some stage has to select input data from a plurality of datasets available on a platform. A typical user experience is to choose datasets from a list. The datasets may be ordered to make finding a relevant dataset more convenient. Typical approaches are to order by name or modification time. When there are lots of datasets and a user does not remember name of those needed, the user may need to glance through most of a list of datasets and the available sorting options do not help much.

SUMMARY

In one aspect, a computer-implemented method for measuring relevance of datasets to data science models is provided. The computer-implemented method includes extracting keywords in each of data science models. The method further includes determining first relative frequencies of respective ones of the keywords in each of the data science models, for each source group in the data science models. The method further includes extracting keywords in each of datasets. The method further includes determining second relative frequencies of respective ones of the keywords in each of the datasets, for each source group in the datasets. The method further includes determining weights of the keywords, based on source categories of the keywords. The method further includes calculating first aggregated relevant scores of respective ones of the keywords in each of the data science models, based on the first relative frequencies and the weights. The method further includes calculating second aggregated relevant scores of respective ones of the keywords in each of the datasets, based on the second relative frequencies and the weights. In the method, the first aggregated relevant scores and the second aggregated relevant scores are used to order relevance of the datasets to the data science models.

In another aspect, a computer program product for measuring relevance of datasets to data science models is provided. The computer program product comprises a computer readable storage medium having program instructions embodied therewith, and the program instructions are executable by one or more processors. The program instructions are executable to: extract keywords in each of data science models; determine first relative frequencies of respective ones of the keywords in each of the data science models, for each source group in the data science models; extract keywords in each of datasets; determine second relative frequencies of respective ones of the keywords in each of the datasets, for each source group in the datasets; determine weights of the keywords, based on source categories of the keywords; calculate first aggregated relevant scores of respective ones of the keywords in each of the data science models, based on the first relative frequencies and the weights; and calculate second aggregated relevant scores of respective ones of the keywords in each of the datasets, based on the second relative frequencies and the weights, wherein the first aggregated relevant scores and the second aggregated relevant scores are used to order relevance of the datasets to the data science models.

In yet another aspect, a computer system for measuring relevance of datasets to data science models is provided. The computer system comprises one or more processors, one or more computer readable tangible storage devices, and program instructions stored on at least one of the one or more computer readable tangible storage devices for execution by at least one of the one or more processors. The program instructions are executable to extract keywords in each of data science models. The program instructions are further executable to determine first relative frequencies of respective ones of the keywords in each of the data science models, for each source group in the data science models. The program instructions are further executable to extract keywords in each of datasets. The program instructions are further executable to determine second relative frequencies of respective ones of the keywords in each of the datasets, for each source group in the datasets. The program instructions are further executable to determine weights of the keywords, based on source categories of the keywords. The program instructions are further executable to calculate first aggregated relevant scores of respective ones of the keywords in each of the data science models, based on the first relative frequencies and the weights. The program instructions are further executable to calculate second aggregated relevant scores of respective ones of the keywords in each of the datasets, based on the second relative frequencies and the weights, wherein the first aggregated relevant scores and the second aggregated relevant scores are used to order relevance of the datasets to the data science models.

DETAILED DESCRIPTION

Embodiments of the present invention propose a method for smart ordering of datasets by relevance to a data science model that a user currently works on. The datasets may be ordered using a measure of relevance of the datasets to the model. The relevance can be measured by determining features of the datasets (such as column data types, keywords from columns, and dataset names) and features of the model, and correlations between the features. The implementation of proposed method includes extracting keyword metrics from datasets and data science models, and the implementation further includes applying extracted keyword metrics for sorting the order of datasets.

Figure 1:
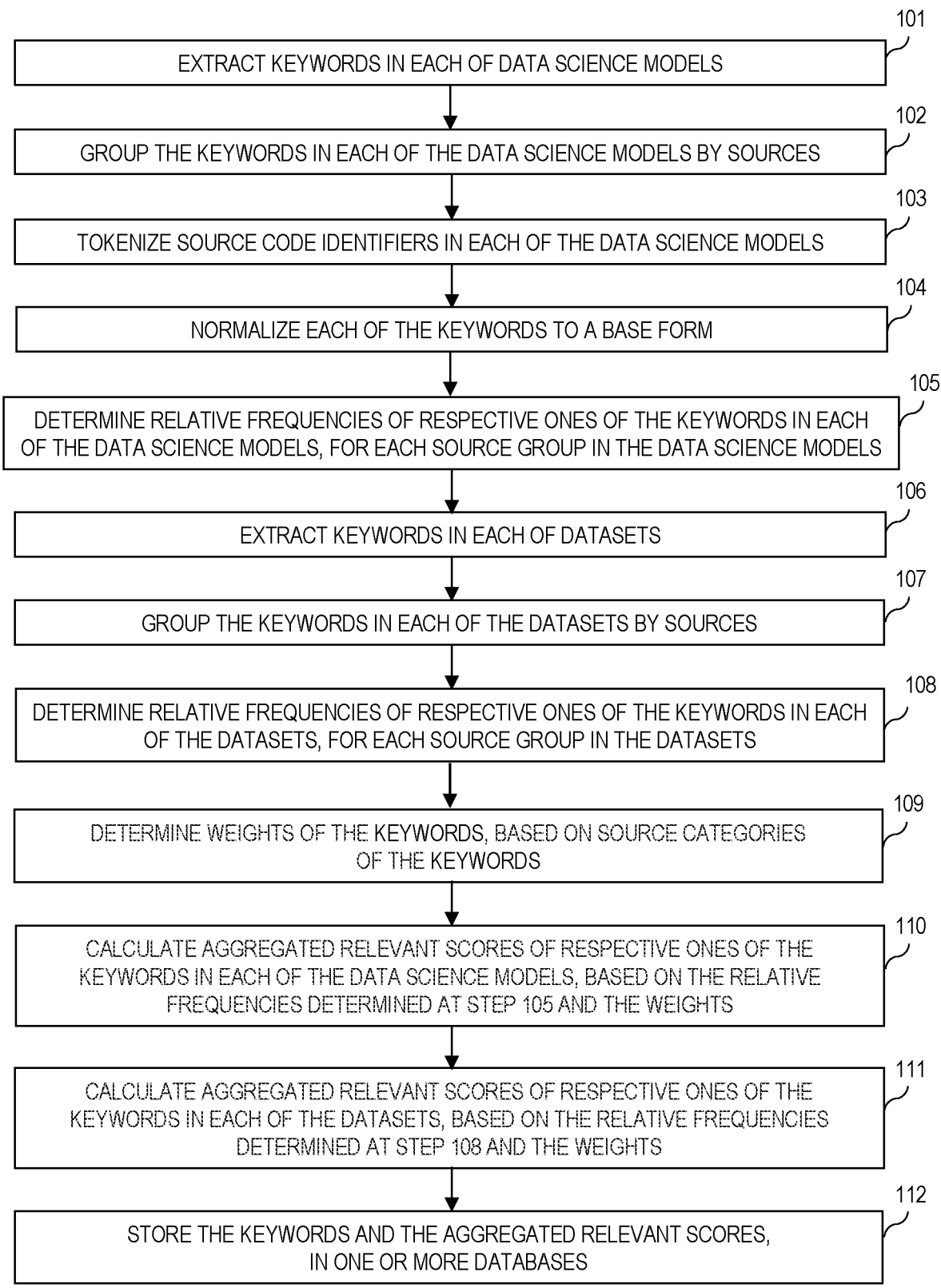
FIG. 1 is a flowchart showing operational steps of measuring relevance of datasets to data science models, in accordance with one embodiment of the present invention.

FIG. 1 is a flowchart showing operational steps of measuring relevance of datasets to data science models, in accordance with one embodiment of the present invention. The operational steps are implemented on one or more servers. A server is described in more detail in later paragraphs with reference to FIG. 3. The operational steps may be implemented in a cloud computing environment. The cloud computing environment is described in more detail in later paragraphs with reference to FIG. 4 and FIG. 5.

At step 101, the one or more servers extract keywords in each of data science models. At step 102, the one or more servers group the keywords in each of the data science models by sources. The sources include but not limited to tags of the data science models, free form natural language text, and identifiers in source code of the data science models. The free form natural language text includes but not limited to names of the data science models, descriptions of the data science models, comments in source code of the data science models, and descriptive data (e.g., name, description, tags, etc.) of modules imported from model source code. The descriptive data may be fetched from online repositories. The identifiers in the source code include but not limited to variable names, function names, literal string values, and filenames (when the data science model includes multiple files).

At step 103, the one or more servers tokenize source code identifiers in each of the data science models, by commonly used separators (such as underscores and upper cases in camel cases). At step 104, the one or more servers normalize each of the keywords in each of the data science models to a base form. The one or more servers extract the base form of a word. Optionally, the one or more servers find synonyms (in dictionaries) of the word and add the synonyms to the results. The one or more servers use a stemming process which reduces inflected (or sometimes derived) words to their word stem, base or root form. For example, words "walk", "walking", "walked", and "walks" are normalized to a base form: "walk".

At step 105, the one or more servers determine relative frequencies of respective ones of the keywords in each of the data science models, for each source group in the data science models. For a data science model and a source group, one relative frequency of one keyword is calculated by the one or more server. For example, there is a data science model named "house building schedule"; there are multiple identifiers in the source code of the data science model, including "schedule" and "days"; and there are source groups such as "name" and "source code". In this example, for the source group "name" in the model "house building schedule", the relative frequency of the keyword "schedule" is calculated; in the calculation, any value between 0 and 1 may be obtained for the relative frequency. In the same example, for the source group "source code" in the model "house building schedule", the relative frequency of the keyword "schedule" is calculated; in the calculation, any value between 0 and 1 may be obtained. In the same example, for the source group "name" in the model "house building schedule", the relative frequency of the keyword "day" is calculated; the relative frequency is determined as 0 because the keyword "day" does not occur in the "name" of the model. In the same example, for the source group "source code" in the model "house building schedule", the relative frequency of the keyword "days" is calculated; in the calculation, any value between 0 and 1 may be obtained.

At step 106, the one or more servers extract keywords in each of datasets. At step 107, the one or more servers group the keywords in each of the datasets by sources. The sources include but not limited to column names, dataset names, tags or other supplemental data associated with datasets, and string values from data rows.

At step 108, the one or more servers determine relative frequencies of respective ones of the keywords in each of the datasets, for each source group in the datasets. For a dataset and a source group, one relative frequency of one keyword is calculated by the one or more server.

At step 109, the one or more servers determine weights of the keywords, based on source categories of the keywords. The one or more servers determine the weights of the keywords extracted from each of the data science models and the weights of the keywords extracted from each of the datasets. The weights may be introduced depending on source categories of the keywords; for example, a keyword from a model name has a higher weight than a keyword from description of libraries used in a data science model.

At step 110, the one or more servers calculate aggregated relevant scores of respective ones of the keywords in each of the data science models, based on the relative frequencies determined at step 105 and the weights. For the respective keywords extracted from each of the data science models, the aggregated relevant scores are calculated. The calculation of the aggregated relevant scores is based on the relative frequencies of the keywords in each of the data science models and the weights.

At step 111, the one or more servers calculate aggregated relevant scores of respective ones of the keywords in each of the datasets, based on the relative frequencies determined at step 108 and the weights. For the respective keywords extracted from each of the datasets, the aggregated relevant scores are calculated. The calculation of the aggregated relevant scores is based on the relative frequencies of the keywords in each of the datasets and the weights.

In the present invention, calculation of the aggregated relevant scores of respective ones of the keywords in each of the data science models (at step 110) and calculation of the aggregated relevant scores of respective ones of the keywords in each of the datasets (at step 111) use modified Term Frequency-Inverse Document Frequency (TF-IDF) algorithm or similar algorithms.

First, let us discuss conventional TF-IDF algorithm. TF-IDF is an algorithm widely used for measuring relevance of a term (word) to a document from corpus (a collection of documents). Typical application is for search engines, where terms from user's query are scored against all indexed documents using TF-IDF. Document(s) of highest TF-IDF for given term are returned as a search result. Values of TF-IDF are normalized, so that for any pair of term and document a TF-IDF value is a real number in range from 0 to 1. A TF-IDF value of 0 means no relevancy at all; in other words, a TF-IDF value of 0 means that either the term does not occur in the document or it occurs in all the documents. The highest value, the stronger relevance.

If values of TF-IDF are calculated for all documents and terms occurring in the corpus, the values of TF-IDF can be used to compare similarity between documents. For every document, a vector of TF-IDF values for all terms can be used. To measure documents similarity, a measure such as cosine similarity of TF-IDF vectors of the documents can be used. This method is useful for comparing documents of uniform structure, for which the location of the term within a document does not make a difference. This assumption is not valid in many real world applications; for example, a term occurring in the document title it may be an indication of stronger relevance than a term in the actual content of the document. This observation can be taken into account by adding weights to TF-IDF values depending on part of the document where the term occurs.

Previously, TF-IDF vectors are calculated for documents of the same type and structure which together are part of a single corpus. The regular TF-IDF algorithm is not applicable for the purpose of measuring relevance between two types of documents, which are parts of two distinct corpuses. Therefore, the regular TF-IDF algorithm cannot be easily applied to measuring relevance between the data science models and the datasets.

Embodiments of the present invention propose to calculate TF-IDF scores for each source categories within documents (e.g., variable names, comments, etc.) across all documents and then calculate an aggregated score (e.g., weighted sum) for each document.

$$s_{td} = \sum_{c \in C} (\alpha_c \cdot TFIDF_{ctd}),$$

where $s_{td}$ is the aggregated score for term t in document d, C is a set of term source categories, $\alpha_c$ is a weight for term source category c, and $TFIDF_{ctd}$ is a TF-IDF score of term t in document d in term source category c. By definition, $$TFIDF_{Ctd} = TF_{Ctd} \cdot IDF_{ct},$$

where $TF_{Ctd}$ is a frequency of term t within term source category c of document d and $IDF_{ct}$ is an inverse frequency of documents that contain term t in term source category c to all documents.

Document d refers to either a data science model or a dataset, term t refers to a keyword extracted from a data science model or a dataset, term source category c refers to a source category of keywords.

Note that the number of source categories and their weights may be different for each document type (data science model or dataset). Those aggregated TF-IDF scores for every document-term pair are then used to form a TF-IDF vector for each document. By calculating a similarity measure between a model vector and vectors for a respective one of the datasets, a relevance score can be calculated for the respective one of the datasets.

At step 112, the one or more servers store the keywords and the aggregated relevant scores, in one or more databases. The aggregated relevant scores include the aggregated relevant scores calculated at step 110 and the aggregated relevant scores calculated at step 111. The aggregated relevant scores stored in the one or more databases will be used for ordering relevance of datasets to a data science model, when a request of browsing datasets to select a dataset for a data science model is received. Ordering the datasets based on the aggregated relevant scores is described in detail in latter paragraphs with reference to FIG. 2.

In one embodiment, after extracting the keywords from data science models (at step 101) or from datasets (at step 106), word embedding is calculated using algorithm such as Word2vec or similar context independent word embedding algorithm. The measure of vector similarity (such as Euclidean distance) is used to find synonyms and related words between a model keywords set and a dataset keywords set. The keywords which have similarity (such as Euclidean distance) below a predetermined threshold may be also considered in calculating aggregated relevant scores (at steps 110 and 111), in addition to direct word matches. The similarity measure may be used for weighting the impact of the keywords in the relevance calculation.

Figure 2:
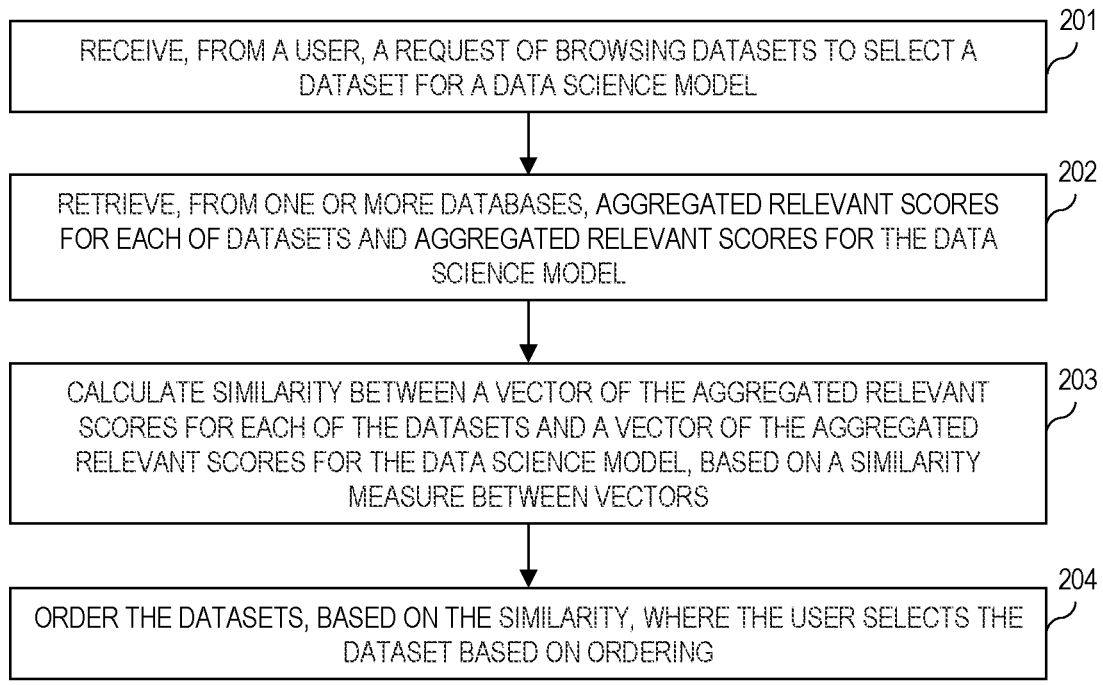
FIG. 2 is a flowchart showing operational steps of sorting an order of datasets based on relevance of datasets to a data science model, in accordance with one embodiment of the present invention.

FIG. 2 is a flowchart showing operational steps of sorting an order of datasets based on relevance of datasets to a data science model, in accordance with one embodiment of the present invention. The operational steps included in FIG. 2 are implemented on one or more servers. A server is described in more detail in later paragraphs with reference to FIG. 3. The operational steps may be implemented in a cloud computing environment. The cloud computing environment is described in more detail in later paragraphs with reference to FIG. 4 and FIG. 5.

At step 201, the one or more servers receive, from a user, a request of browsing datasets to select a dataset for a data science model. When the user wants to add one dataset to the data science model, the user requests the one or more servers to provide assistant in selecting the dataset for the data science model.

At step 202, the one or more server retrieve, from one or more databases, aggregated relevant scores for each of datasets and aggregated relevant scores for the data science model. Upon receiving the request from the user at step 201, the one or more server retrieve the aggregated relevant scores. The aggregated relevant scores for each of datasets have been calculated at step 110, the aggregated relevant scores for the data science model have been calculated at step 110, and these aggregated relevant scores have been stored in the one or more database at step 112 described in FIG. 1.

At step 203, the one or more server calculate similarity between a vector of the aggregated relevant scores for each of the datasets and a vector of the aggregated relevant scores for the data science model, based on a similarity measure between vectors. Retrieving the aggregated relevant scores, the one or more server obtain vectors of the aggregated relevant scores for respective ones of the datasets and obtain a vector of the aggregated relevant scores for the data science model. The one or more server evaluate the similarity between a pair of the vector for the data science model and one vector for one dataset; the similarity will be evaluated for all pairs of the vector for the data science model and different vectors for different datasets. For example, the similarity measure may be cosine similarity.

At step 204, the one or more server order the datasets, based on the similarity, where the user selects the dataset based on ordering. Based on the similarity calculated at step 203, the one or more server order the datasets; in other words, the datasets are ordered based on the relevance of the datasets to the data science model. The order given by the one or more server assists the user in selecting the dataset for the data science model. The user will use the information given at step 204 to select the dataset.

Figure 3:
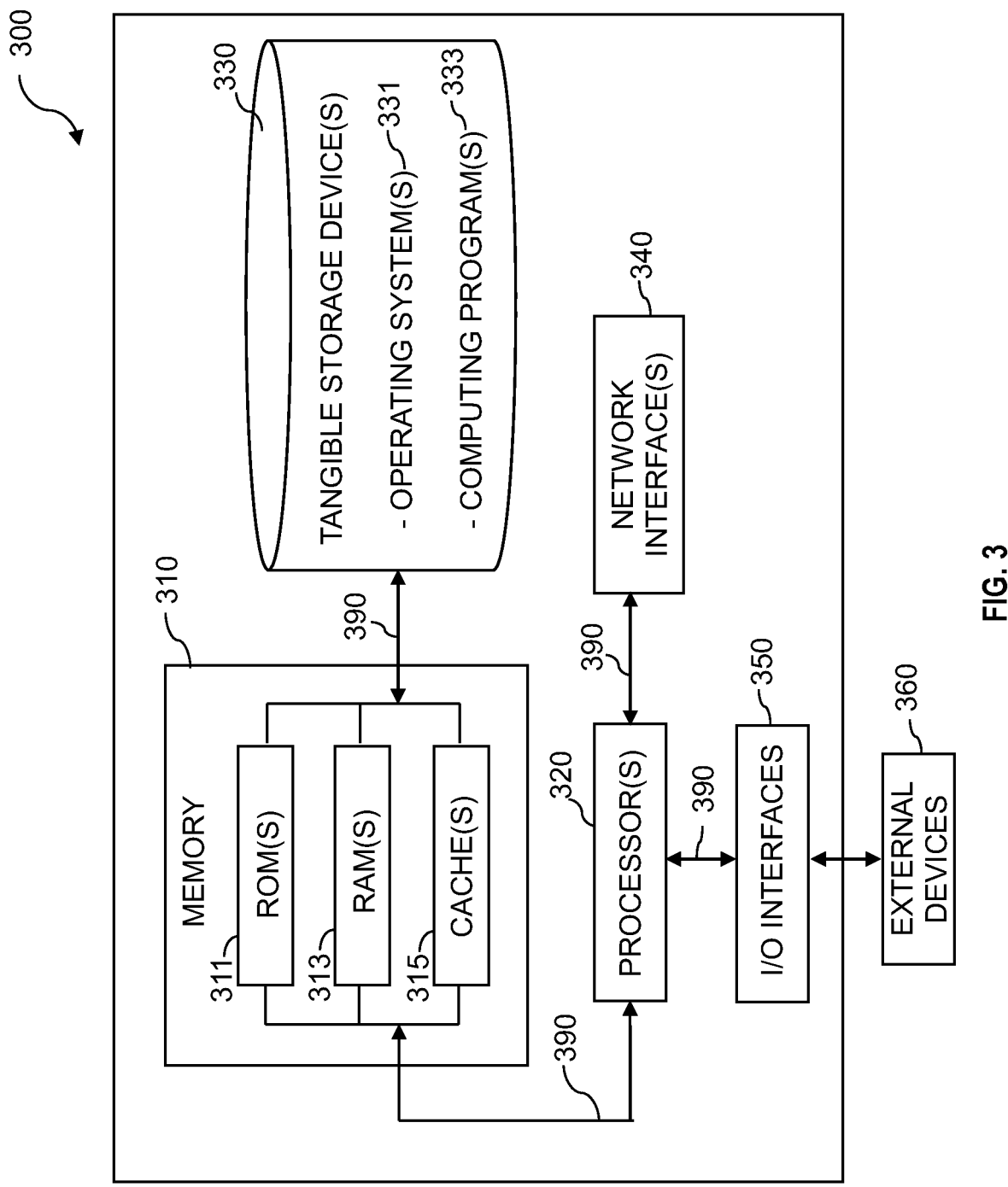
FIG. 3 is a diagram illustrating components of a server, in accordance with one embodiment of the present invention.

FIG. 3 is a diagram illustrating components of server 300, in accordance with one embodiment of the present invention. It should be appreciated that FIG. 3 provides only an illustration of one implementation and does not imply any limitations; different embodiments may be implemented.

Referring to FIG. 3, server 300 includes processor(s) 320, memory 310, and tangible storage device(s) 330. In FIG. 3, communications among the above-mentioned components of server 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330.

Server 300 further includes I/O interface(s) 350. I/O interface(s) 350 allows for input and output of data with external device(s) 360 that may be connected to server 300. Server 300 further includes network interface(s) 340 for communications between server 300 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
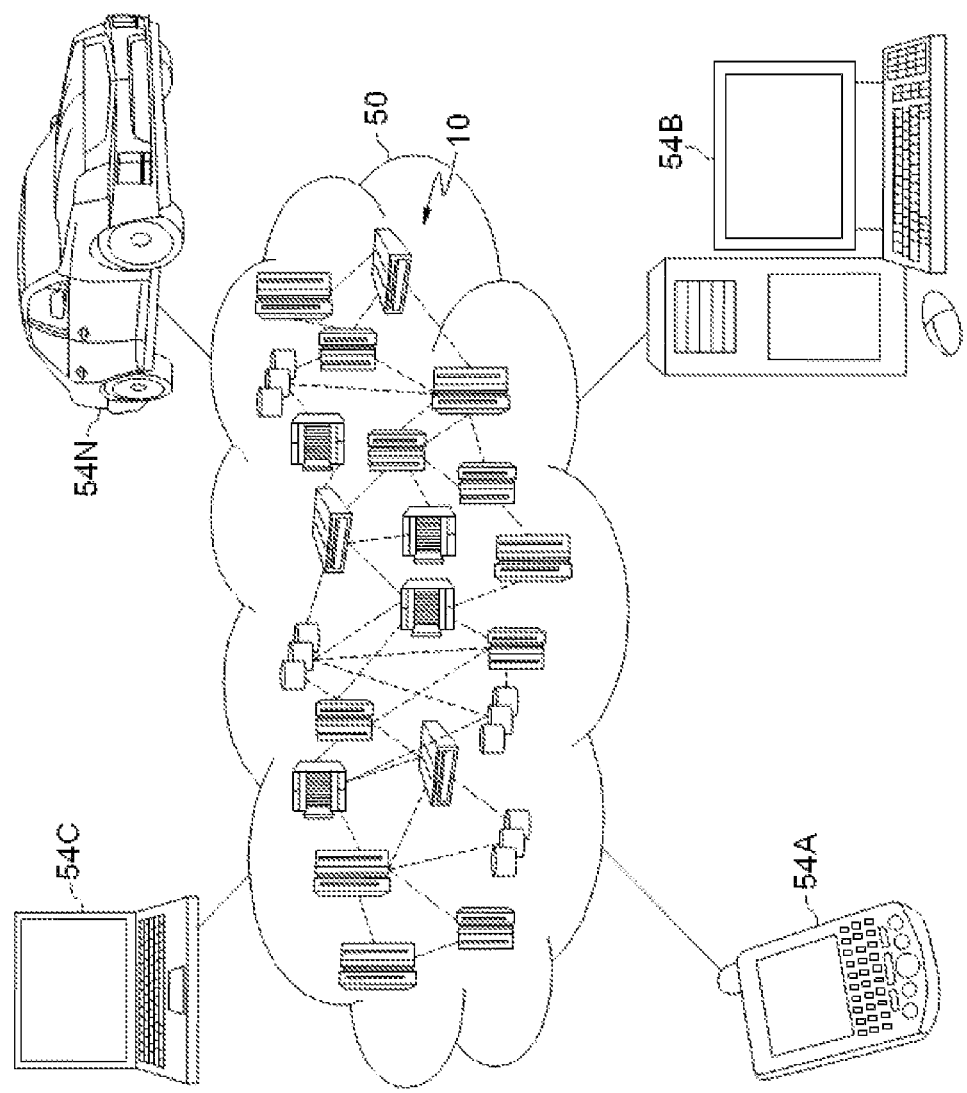
FIG. 4 depicts a cloud computing environment, in accordance with one embodiment of the present invention.

Referring now to FIG. 4, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 5:
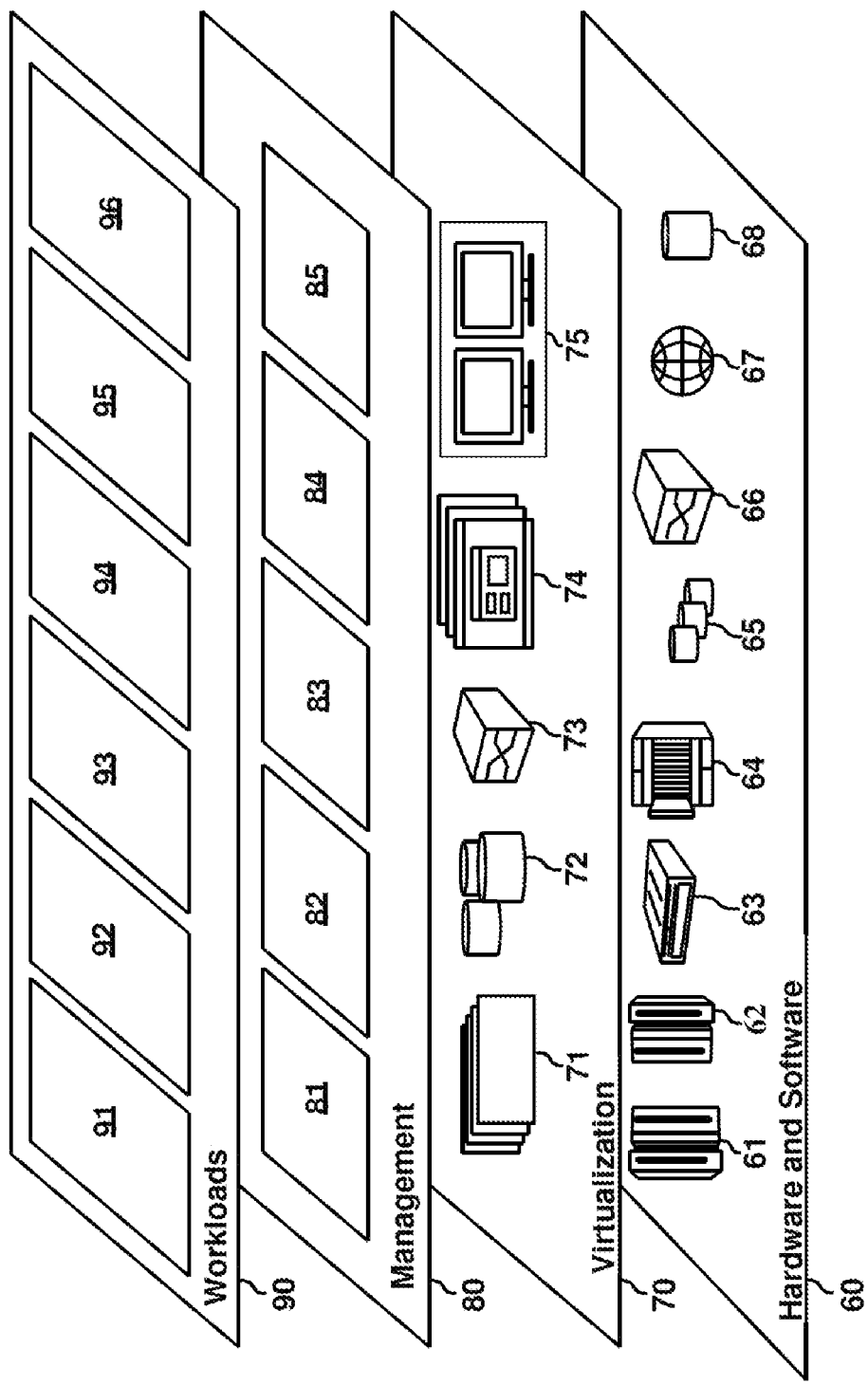
FIG. 5 depicts abstraction model layers in a cloud computing environment, in accordance with one embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of selecting a dataset for measuring relevance of datasets to a data science model.

What is claimed is:

1. A computer-implemented method for measuring relevance of datasets to data science models, the method comprising:
   from each of data science models, extracting keywords, wherein the data science models include artificial intelligence models, machine learning models, and optimization models;
   determining first relative frequencies of respective ones of the keywords in each of the data science models, for each of sources in the data science models, wherein the sources in the data science models include tags of the data science models, free form natural language text, and identifiers in source code of the data science models;
   extracting keywords in each of datasets to be used by the data science models;
   determining second relative frequencies of respective ones of the keywords in each of the datasets, for each of sources in the datasets, wherein the sources in the dataset include column names, dataset names, tags or other supplemental data associated with datasets, and string values from data rows;
   determining weights of the keywords, based on source categories of the keywords;
   calculating first aggregated relevant scores of respective ones of the keywords in each of the data science models, based on the first relative frequencies and the weights;
   calculating second aggregated relevant scores of respective ones of the keywords in each of the datasets, based on the second relative frequencies and the weights;
   providing a user with an order of relevance of the datasets to the data science models, based on the first aggregated relevant scores and the second aggregated relevant scores; and
   wherein a dataset is selected for a given data science model, based the order of the relevance.

2. The computer-implemented method of claim 1, further comprising:
   storing the first aggregated relevant scores and the second aggregated relevant scores, in one or more databases.

3. The computer-implemented method of claim 2, for selecting the dataset for the given data science model, further comprising:
   receiving, from a user, a request of browsing the datasets to select the dataset for the given data science model;
   retrieving, from the one or more databases, the first aggregated relevant scores and the second aggregated relevant scores;
   calculating similarity between a vector of the second aggregated relevant scores for each of the datasets and a vector of the first aggregated relevant scores for the given data science model, based on a similarity measure between vectors; and
   based on the similarity, obtaining the order the relevance of the datasets to the data science models.

4. The computer-implemented method of claim 3, wherein the similarity measure is cosine similarity.

5. The computer-implemented method of claim 1, wherein the first aggregated relevant scores and the second aggregated relevant scores are calculated using a modified Term Frequency-Inverse Document Frequency (TF-IDF) algorithm.

6. The computer-implemented method of claim 1, further comprising:
   grouping the keywords in each of the data science models by sources;
   tokenizing source code identifiers in each of the data science models; and
   normalizing each of the keywords in each of the data science models to a base form.

7. A computer program product for measuring relevance of datasets to data science models, the computer program product comprising a computer readable storage medium having program instructions embodied therewith, the program instructions executable by one or more processors, the program instructions executable to:
   from each of data science models, extract keywords, wherein the data science models include artificial intelligence models, machine learning models, and optimization models;
   determine first relative frequencies of respective ones of the keywords in each of the data science models, for each of sources in the data science models, wherein the sources in the data science models include tags of the data science models, free form natural language text, and identifiers in source code of the data science models;
   extract keywords in each of datasets to be used by the data science models;

determine second relative frequencies of respective ones of the keywords in each of the datasets, for each of sources in the datasets, wherein the sources in the dataset include column names, dataset names, tags or other supplemental data associated with datasets, and string values from data rows;

determine weights of the keywords, based on source categories of the keywords;

calculate first aggregated relevant scores of respective ones of the keywords in each of the data science models, based on the first relative frequencies and the weights;

calculate second aggregated relevant scores of respective ones of the keywords in each of the datasets, based on the second relative frequencies and the weights;

provide a user with an order of relevance of the datasets to the data science models, based on the first aggregated relevant scores and the second aggregated relevant scores; and wherein a dataset is selected for a given data science model, based the order of the relevance.

8. The computer program product of claim 7, further comprising the program instructions executable to:
store the first aggregated relevant scores and the second aggregated relevant scores, in one or more databases.

9. The computer program product of claim 8, for selecting the dataset for the given data science model, further comprising the program instructions executable to:
receive, from a user, a request of browsing the datasets to select the dataset for the given data science model;
retrieve, from the one or more databases, the first aggregated relevant scores and the second aggregated relevant scores;
calculate similarity between a vector of the second aggregated relevant scores for each of the datasets and a vector of the first aggregated relevant scores for the given data science model, based on a similarity measure between vectors; and
based on the similarity, obtain the order the relevance of the datasets to the data science models.

10. The computer program product of claim 9, wherein the similarity measure is cosine similarity.

11. The computer program product of claim 7, wherein the first aggregated relevant scores and the second aggregated relevant scores are calculated using a modified Term Frequency-Inverse Document Frequency (TF-IDF) algorithm.

12. The computer program product of claim 7, further comprising program instructions executable to:
group the keywords in each of the data science models by sources;
tokenize source code identifiers in each of the data science models; and
normalize each of the keywords in each of the data science models to a base form.

13. A computer system for measuring relevance of datasets to data science models, the computer system comprising:
one or more processors, one or more computer readable tangible storage devices, and program instructions stored on at least one of the one or more computer readable tangible storage devices for execution by at least one of the one or more processors, the program instructions executable to:
from each of data science models, extract keywords, wherein the data science models include artificial intelligence models, machine learning models, and optimization models;
determine first relative frequencies of respective ones of the keywords in each of the data science models, for each of sources in the data science models, wherein the sources in the data science models include tags of the data science models, free form natural language text, and identifiers in source code of the data science models;
extract keywords in each of datasets to be used by the data science models;
determine second relative frequencies of respective ones of the keywords in each of the datasets, for each of sources in the datasets, wherein the sources in the dataset include column names, dataset names, tags or other supplemental data associated with datasets, and string values from data rows;
determine weights of the keywords, based on source categories of the keywords;
calculate first aggregated relevant scores of respective ones of the keywords in each of the data science models, based on the first relative frequencies and the weights;
calculate second aggregated relevant scores of respective ones of the keywords in each of the datasets, based on the second relative frequencies and the weights;
provide a user with an order of relevance of the datasets to the data science models, based on the first aggregated relevant scores and the second aggregated relevant scores; and
wherein a dataset is selected for a given data science model, based the order of the relevance.

14. The computer system of claim 13, further comprising the program instructions executable to:
store the first aggregated relevant scores and the second aggregated relevant scores, in one or more databases.

15. The computer system of claim 14, for selecting the dataset for the given data science model, further comprising the program instructions executable to:
receive, from a user, a request of browsing the datasets to select the dataset for the given data science model;
retrieve, from the one or more databases, the first aggregated relevant scores and the second aggregated relevant scores;
calculate similarity between a vector of the second aggregated relevant scores for each of the datasets and a vector of the first aggregated relevant scores for the given data science model, based on a similarity measure between vectors; and
based on the similarity, obtain the order the relevance of the datasets to the data science models.

16. The computer system of claim 15, wherein the similarity measure is cosine similarity.

17. The computer system of claim 13, wherein the first aggregated relevant scores and the second aggregated relevant scores are calculated using a modified Term Frequency-Inverse Document Frequency (TF-IDF) algorithm.

18. The computer system of claim 13, further comprising program instructions executable to:
group the keywords in each of the data science models by sources;
tokenize source code identifiers in each of the data science models; and
normalize each of the keywords in each of the data science models to a base form.

* * * * *